United States Patent [19]

Bernardi et al.

[11] Patent Number: 5,546,145
[45] Date of Patent: Aug. 13, 1996

[54] CAMERA ON-BOARD VOICE RECOGNITION

[75] Inventors: Bryan D. Bernardi, Rochester; Dale F. McIntyre, Honeoye Falls; Clay A. Dunsmore, Fairport; Dana W. Wolcott, Honeoye Falls, all of N.Y.

[73] Assignee: Eastman Kodak Company, Rochester, N.Y.

[21] Appl. No.: 298,014

[22] Filed: Aug. 30, 1994

[51] Int. Cl.⁶ .............................. G03B 29/00; G03B 17/24
[52] U.S. Cl. .................................... 354/76; 354/106
[58] Field of Search .................................. 354/105, 106, 354/75, 76

[56] References Cited

U.S. PATENT DOCUMENTS

| | | | |
|---|---|---|---|
| 2,950,971 | 8/1960 | Lewin | 430/140 |
| 3,439,598 | 4/1969 | Weitzner et al. | 95/12 |
| 4,270,853 | 6/1981 | Hatada et al. | 354/76 |
| 4,270,854 | 6/1981 | Stemme et al. | 354/76 |
| 4,344,682 | 8/1982 | Hattori | 354/62 |
| 4,389,109 | 6/1983 | Taniguchi et al. | 354/60 |
| 4,443,077 | 4/1984 | Tanikawa | 354/21 |
| 4,613,911 | 9/1986 | Ohta | 360/3 |
| 4,642,717 | 2/1987 | Matsuda et al. | 360/105 |
| 4,742,369 | 5/1988 | Ishii et al. | 354/106 |
| 4,905,029 | 2/1990 | Kelley | 354/76 |
| 4,951,079 | 8/1990 | Hoshino et al. | 354/412 |
| 4,965,626 | 10/1990 | Robison et al. | 355/40 |
| 4,977,419 | 12/1990 | Wash et al. | 354/76 |
| 4,983,996 | 1/1991 | Kinoshita | 354/76 |
| 5,023,635 | 6/1991 | Nealon | 354/76 |
| 5,025,283 | 6/1991 | Robison | 355/40 |
| 5,027,149 | 6/1991 | Hoshino et al. | 354/412 |
| 5,070,355 | 12/1991 | Inoue et al. | 354/106 |
| 5,097,278 | 3/1992 | Tamamura et al. | 354/105 |
| 5,099,262 | 3/1992 | Tanaka et al. | 354/105 |
| 5,128,700 | 7/1992 | Inoue et al. | 354/76 |
| 5,142,310 | 8/1992 | Taniguchi et al. | 354/106 |
| 5,146,249 | 9/1992 | Hoda et al. | 354/21 |
| 5,160,952 | 11/1992 | Iwashita et al. | 354/76 |
| 5,245,372 | 9/1993 | Aoshima | 354/106 |
| 5,276,472 | 1/1994 | Bell et al. | 354/76 |
| 5,313,235 | 5/1994 | Inoue et al. | 354/76 |
| 5,426,745 | 6/1995 | Baji et al. | 395/375 |

FOREIGN PATENT DOCUMENTS 0342628  11/1989  European Pat. Off. ........ G03B 17/30

OTHER PUBLICATIONS

Patent Abstract of Japan; Kazuya, Nomura; Shutter Driving Device; Sep. 25, 1991; vol. 15 No. 380 (p.–1256).

*Primary Examiner*—Michael L. Gellner
*Assistant Examiner*—Michael Dalakis
*Attorney, Agent, or Firm*—David A. Howley; Joseph F. Breimayer

[57] ABSTRACT

In a camera, apparatus and methods for recording or storing voiced in messages in message memory associated with an exposed image frame for reproduction as an annotation with prints made from the exposed image frames. The camera includes a voice recognition system for voice recognition of words spoken by the user before the words are stored in message memory. Fixed and adjustable vocabularies are provided for use in the voice recognition. The adjustable vocabulary may be loaded into the camera by a vocabulary memory card or through an interface with a docking station of a personal computer or vending machine so that an adjustable vocabulary of words of interest to the camera user or related to a scene or event of photographic interest may be employed in the voice recognition. The messages may be recorded on magnetic film layers or stored in camera on-board memory or in detachable message memory modules to be forwarded with the exposed film strip to a photofinisher for read out and printing on the prints. The messages may be stored or recorded by the user in real time with each exposure or at an earlier or later time.

22 Claims, 10 Drawing Sheets

CAMERA ON-BOARD VOICE RECOGNITION

CROSS-REFERENCE TO RELATED APPLICATION

Cross-reference is hereby made to commonly assigned U.S. patent application Ser. No. 08/298,101 filed on even date herewith to VOICE RECOGNITION OF RECORDED MESSAGES FOR PHOTOGRAPHIC PRINTERS in the names of Dale F. McIntyre, Bryan D. Bernardi and Dana W. Wolcott.

FIELD OF THE INVENTION

This invention relates to the field of photographic film cameras and film processing, and particularly to apparatus for providing voice information storage and retrieval capabilities employing speech recognition.

BACKGROUND OF THE INVENTION

A variety of advanced still camera systems have been recently disclosed in which data related to the scenes photographed is input into memory associated with the film strip to be forwarded to the photofinisher to aid in making prints, and, in some instances including messages or annotations to be associated with the prints. As set forth in commonly assigned U.S. Pat. No. 5,276,472, (incorporated herein by reference in its entirety) systems for providing voice recording in cameras in association with the exposure of each film image frame have become known in the art. In the '472 patent, a system is provided for recording a message in transparent magnetic film tracks in a magnetics-on-film (MOF) layer on the non-emulsion side of the film overlying the image frame area. The user may speak words into a camera microphone/speaker that are processed into digital signals stored temporarily in memory. When the message is completed, the user may command the camera to play it back audibly for review and editing as considered necessary. When the message content is considered satisfactory, the digitized annotation may be recorded in the MOF layer tracks of the exposed image frame during advancement of the film to the next image frame. The user may continue recording messages for each image frame exposed, and the fully exposed film is processed so that the resulting prints carry the annotations corresponding to the messages recorded.

The '472 patent is directed to such a system where the coding of each message on the associated print is done during the photofinishing operation in such a way that the machine readable coded information allows the audible reproduction of the message through the use of a special hand-held scanner. The coded information is in the form of a bar code, a blister spot pattern or the like that may be scanned and translated into an audio voice reproduction by the hand-held scanner moved over the coded information. A brief alphanumeric place and date annotation may also be printed in the border of the print.

The system disclosed in the '472 patent thus simply phonetically processes the speech that is recorded into coded information, and the hand-held scanner phonetically reproduces the words. A brief, alphanumeric place and date annotation may also be printed in the border of the print by the user or the photofinisher from listening to and manually transcribing the recorded message. The quality and accuracy of reproduction of the message depends on how carefully and clearly the words are spoken by the user during the editing and re-recording operation.

In order to store such information, as well as the image frame identification to which it pertains, and other information automatically entered from the camera operating system or optionally entered by the camera user, it is necessary to employ such a further writable and readable media in association with either the film (as disclosed in the '472 patent) or in some other storage media or memory.

With respect to recording camera operating conditions and time and date for each image frame exposure other than on the film itself, it has been proposed to magnetically read and write data on magnetic strips formed on the sides or an end of the film cartridge, as described, for example, in U.S. Pat. No. 4,443,077. More recently, it has been suggested that such data may be stored and retrieved from non-volatile memory chips, e.g. an EEPROM, incorporated in an integrated circuit chip "card" as set forth in U.S. Pat. No. 5,128,700. The card may be separable from the camera and film cartridge, or a similar EEPROM card may be attached to the film cartridge as set forth generally in U.S. Pat. No. 5,070,355. Alternatively, the storage of such information in "ROM-ICs" attached permanently or releasibly to the sides or ends of film cartridges is disclosed in U.S. Pat. No. 5,142,310.

The '700 patent also stores sound or voice messages related to the image frames in the removable sound cards that are intended to accompany the film when it is sent in for processing, so that the message may be reproduced as a sound code with the print made from the negative film image frame for phonetic playback of the message. Alternatively, the card itself is read out phonetically. As in the '472 patent, the sound is reproduced phonetically as the coded information or recorded data is scanned.

In another embodiment disclosed in the '700 patent and in a further U.S. Pat. No. 4,344,682, a camera is described for recording information related to each image frame as small alphanumeric characters exposed in a corner portion of the image frame for photographic reproduction on the print made from the negative image frame. The information may be recorded or stored in temporary memory prior to making the exposures of the image frames and exposed on the image frames in conjunction with the image frame exposure. As each message is inputted into memory, it is displayed and may be edited. The input mechanism depicted is a keyboard, but it is suggested that other input means, including a voice recognition device, may be substituted for the keyboard.

In an electronic still camera disclosed in U.S. Pat. No. 4,742,369, it is also suggested that a keyboard or a voice recognition circuit be employed to input spoken information to be stored regarding each image that is captured by the camera.

In a further camera system, e.g. that disclosed in U.S. Pat. No. 5,027,149, voiced commands are given by the user to command each camera operation. A voice recognition circuit is employed in a system for training the camera to recognize and respond accurately to the spoken commands.

Problems to be Solve by the Invention

It is difficult to accurately reproduce spoken words stored in analog or digital form in a non-photographic media associated with film strip image frames as alphanumeric, readable annotations on the prints made from the image frames. It is desirable to make the reproduction without human inspection of the annotation before it is printed in the border of the print. It is not possible to rely simply on the editing process and careful pronunciation of the words to ensure that they are processed accurately before they are stored for later read out and printing as annotation on the prints made from the exposures.

SUMMARY OF THE INVENTION

It is therefore an object of the present invention to provide a method and apparatus for ensuring the accurate processing of spoken words that can be accurately reproduced by photofinishing equipment.

These and other objects of the invention are realized in a photographic camera including an optical lens, a photographic filmstrip transport mechanism for advancing the filmstrip in a path of travel to and through an image frame exposure gate with respect to said optical lens, and an exposure system for making an exposure of the filmstrip image frame in the exposure gate, apparatus for recording a voice message related to the exposure made or to be made for playback in conjunction with making prints from the photographic images captured in the image frames of the filmstrip to provide for the printing of the voice message therewith comprising: speech input means into which a camera user may speak words of the message to be stored with respect to the filmstrip image frames; sound processing means for processing the words spoken into the speech input means as voice digital data; means for providing reference voice digital data corresponding to a reference word vocabulary; speech recognition means for comparing the processed voice digital data to the reference voice digital data and recognizing processed voice digital data corresponding to the reference vocabulary voice digital data; message memory means having memory locations related to each image frame of the filmstrip for storing recognized voice digital data; and means for storing the recognized voice digital data in said message memory means.

A variety of vocabulary sources may be employed to load in a fixed vocabulary and adjustable vocabulary of voice digital data corresponding to commonly used words and words specific to an event or attraction of photographic interest. The vocabulary sources may be detachable vocabulary memory cards insertable into the camera for connection with the camera system or may comprise an interface for down loading vocabulary words from a camera docking station.

Similarly, the message memory means may comprise memory media associated with the film strip and detachable with the film cartridge for transfer to the photofinisher or may remain in the camera if the camera is a single use, recyclable camera returned with the film cartridge to the photofinisher for processing.

The user may employ methods of recording or storing the messages in real time with the exposure of each image frame employing voice recognition or at a later time.

ADVANTAGES OF THE INVENTION

The invention advantageously results in the storage of accurate word messages in relation to film strip image frames that may be automatically read out and accurately printed as readable annotations on the associated print without requiring the photofinisher to interpret and correct the message before it is printed.

BRIEF DESCRIPTION OF THE DRAWINGS

These and other objects, advantages and features of the invention will be become apparent from the detailed description given hereinafter in relation to the accompanying drawings, in which.

DETAILED DESCRIPTION OF THE PREFERRED EMBODIMENTS OF THE INVENTION

Figure 1:
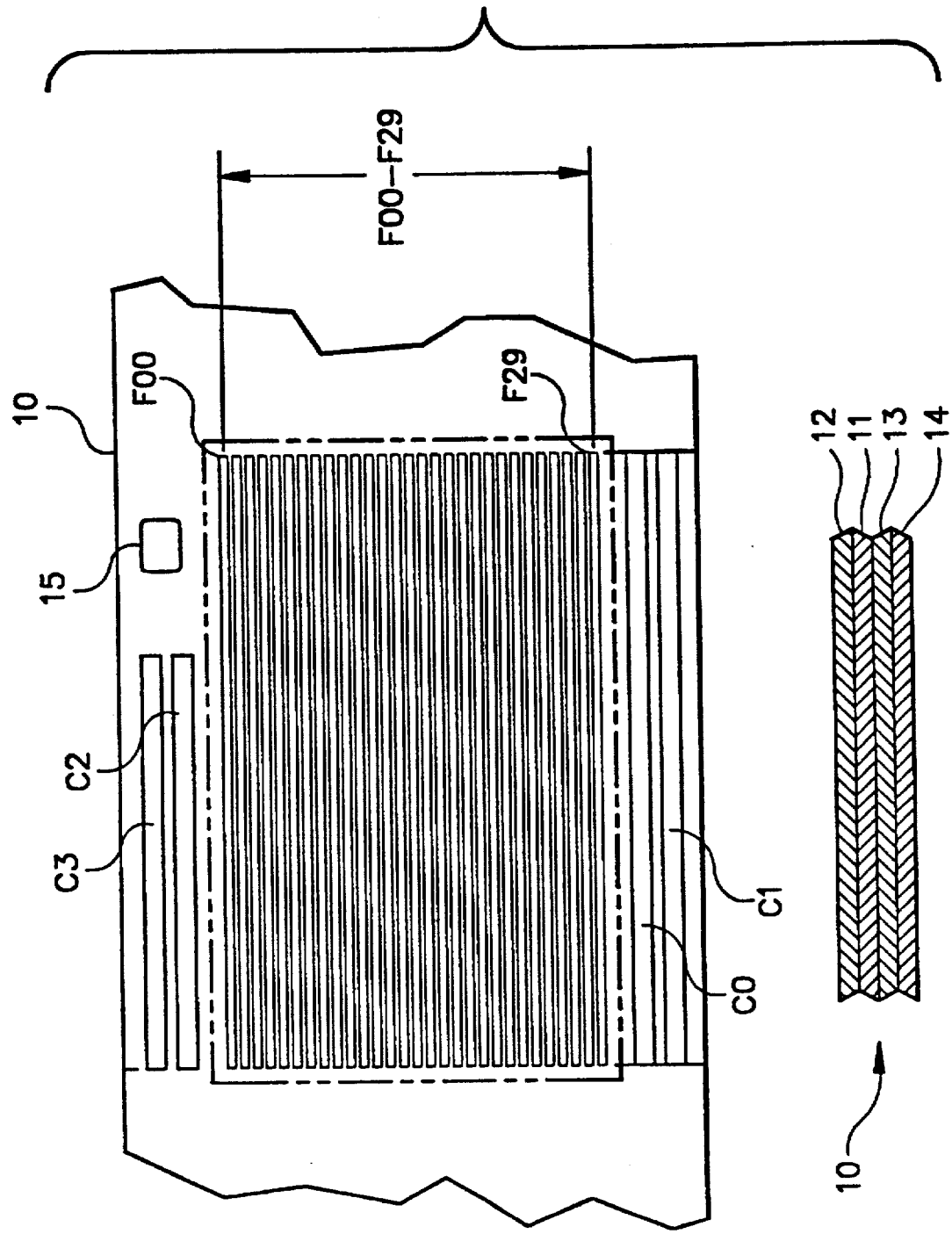
FIG. 1 is a diagram illustrating partial dedicated tracks in a virtually transparent MOF layer and a cross section of the layers of film particularly adapted for use in a camera of a first embodiment of the invention.

In accordance with an aspect of the invention, the camera operating system includes speech recognition of spoken words which are compared to an on-camera word vocabulary stored in fixed vocabulary ROM and adjustable vocabulary RAM or EEPROM or the like as described hereafter. Spoken words are processed and compared to the vocabulary. The acceptance of the word is indicated by displaying it to the user on the camera LCD display or by audibly playing back the closest matching word. Rejection of the word may also be indicated to the user. The user may either speak the word or an alternate word and repeat the process until the word is matched and accepted. In this aspect of the invention, the recognized words form a message that is stored in memory associated with the film image frame so that the memory accompanies the film to the photofinisher where each message can be read out and printed along with the respective print made from the film image frame. The speech recognition operation results in a more automated photofinishing operation not requiring constant operator monitoring and translation of the messages into more readable text.

Due to the space and power supply limitations inherent in miniaturized still cameras, it is not possible at this time to provide a large scale vocabulary covering all words of a given language in the camera or to provide the processing speed sufficient to effect the comparison of the voice digital data to the memorized word data in a reasonable time period. In a further refinement of the invention, it is proposed that the vocabulary of words likely to be spoken by the user to describe the scene being photographed include a fixed vocabulary and an adjustable vocabulary word set. The speech recognition operating system is constructed to accommodate the fixed vocabulary of common words stored in ROM likely to be used in most situations, e.g. the months of the year. The system accommodates an adjustable vocabulary or vocabularies of other words selected by the user and stored in RAM or EEPROM in advance of using the camera and which may be related to specific persons, events or attractions and events. The manner of storing an adjustable vocabulary may include a variety of means and sources, including words keyed in on a camera mounted keyboard, words stored in a personal computer and downloaded through a connector interface, or words stored in plug-in RAM or EEPROM cards inserted into special slots of the camera.

Voice recognition systems that are available commercially function in a variety of ways to process speech or voiced words to derive a match to a pre-stored word in a vocabulary memory unit. Voice recognition systems may be used with vocabulary memory units which involve either "speaker independent training" or "speaker dependent training". Speaker independent training means that each word in a given vocabulary has enough training patterns stored in memory in association with it to distinguish that word from any other word in the vocabulary regardless of the pronunciation of the word by a general population of potential users. The training patterns for the various pronunciations of such words are determined in advance and stored for the words of the vocabulary memory unit before it is supplied to the user in the camera or otherwise as described below. Such words should be recognized by the system when spoken by a fairly broad spectrum of the population and do not require the user to undertake a personalized training regimen of the vocabulary words prior to voicing the words. However, storing a sufficient number of training patterns for each word to ensure reliable recognition is expensive and does take up memory space.

Speaker dependent training means that the words of the vocabulary are trained to be recognized when spoken by a specific person, that is, the trainer and user of the vocabulary. In a training session initiated by the camera and the user, the words in the vocabulary may be displayed one at a time, and the user voices the words into the camera microphone. A training pattern is generated and stored as the user voices each word in the course of completing the training session. For example, if a fixed vocabulary is subjected to speaker dependent training, the speaker is prompted by a displayed or aural command to voice each word of the vocabulary one or more times in sequence. Each spoken word is then processed and the processed signal is stored as the pattern to be recognized for that word in the future. While the process may be time consuming, the memory space required for the unique training pattern associated with the word is reduced. And, of course, the speech recognition system for the speaker dependent vocabulary words may well be unusable by other persons.

Figure 2:
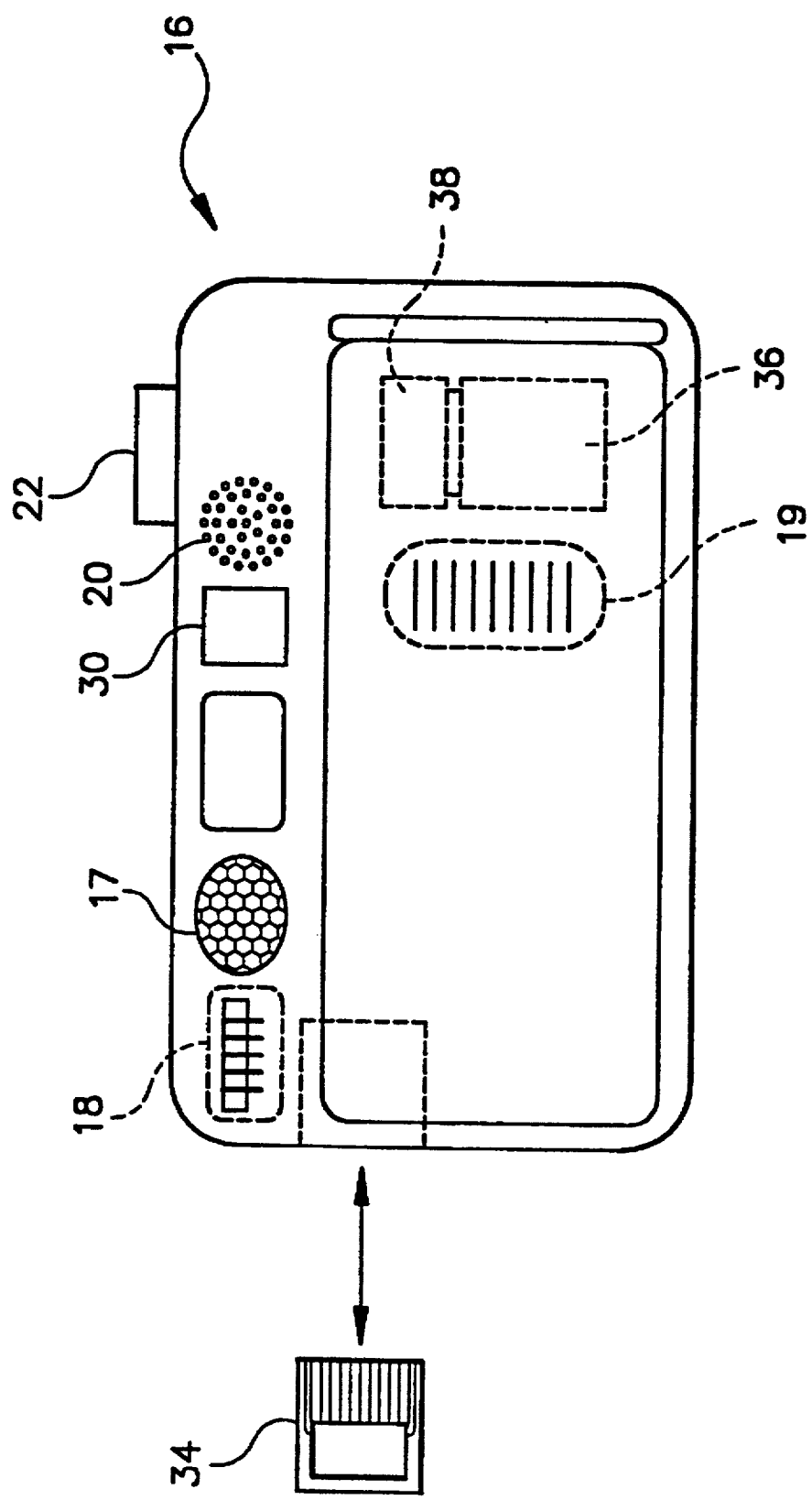
FIG. 2 is a schematic illustration of a camera having speech recording apparatus in accordance with the various embodiments of the invention.
Figure 3:
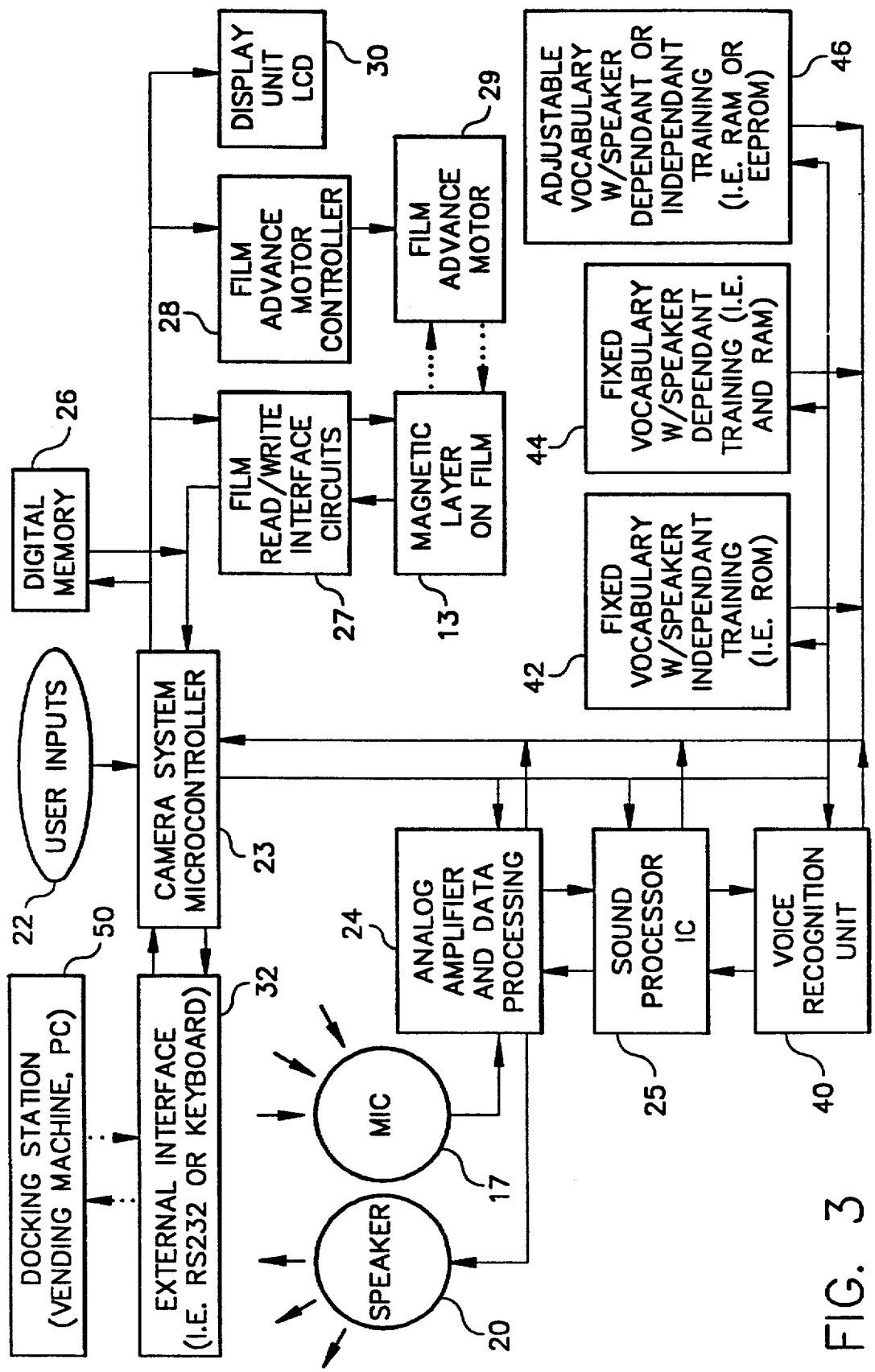
FIG. 3 is a schematic block diagram of a system for recording speech in a camera in accordance with the first embodiment of the invention.
Figure 4:
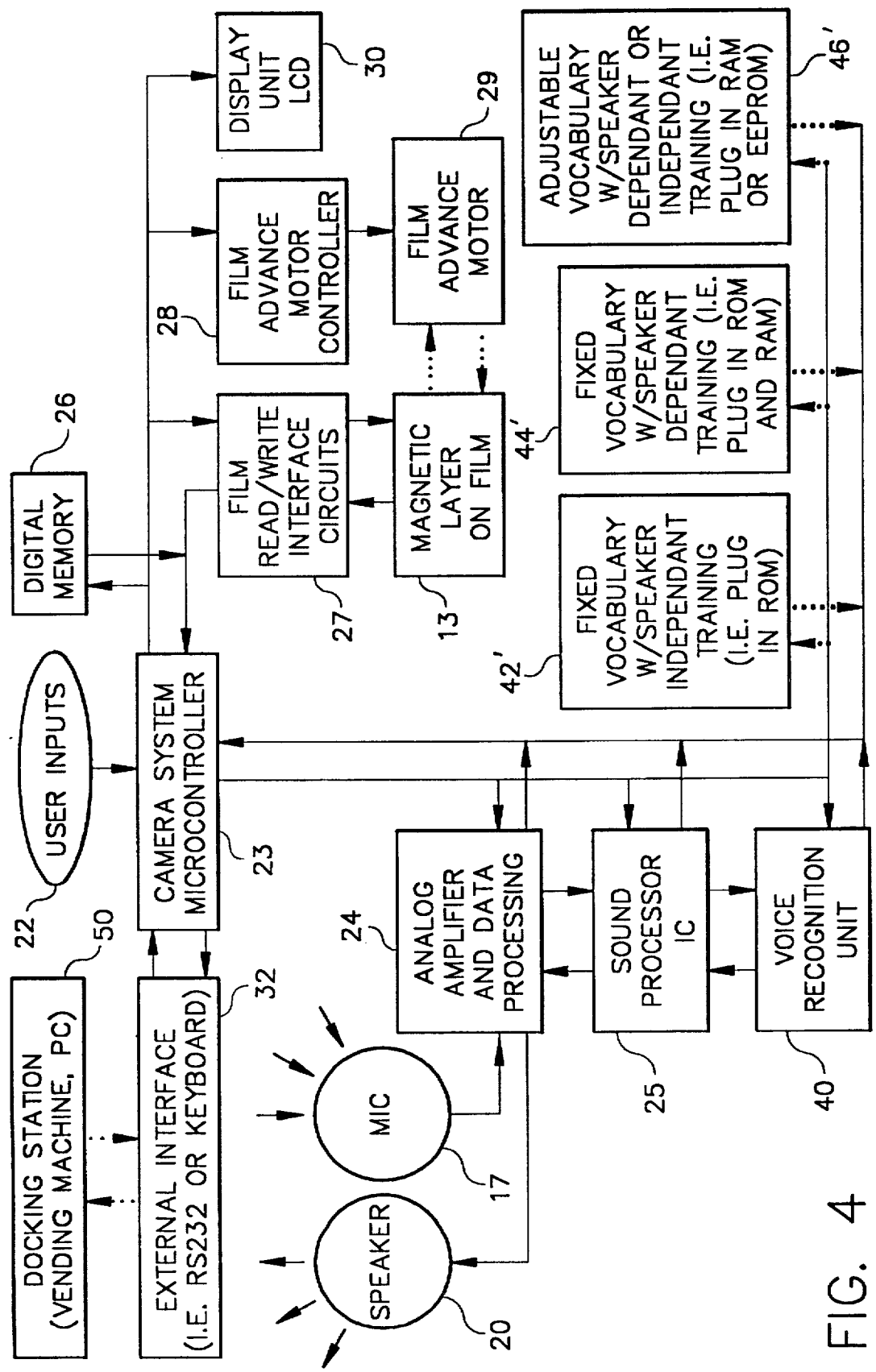
FIG. 4 is a schematic block diagram of a system for recording speech in a camera in accordance with a first variation on the first embodiment of the invention.

Commencing with the various embodiments of the invention, FIGS. 1 and 2 depict, in conjunction with the camera circuits of FIGS. 3 and 4, a first embodiment of the invention in which the recognized voice digital data may be stored in the MOF layer tracks, and the fixed and adjustable vocabulary may be stored in the camera in a variety of ways. In this embodiment, the recognized words are stored in certain of the MOF layer tracks and are read out at the photofinisher to be printed along with the prints made from the film image frames.

Figure 5:
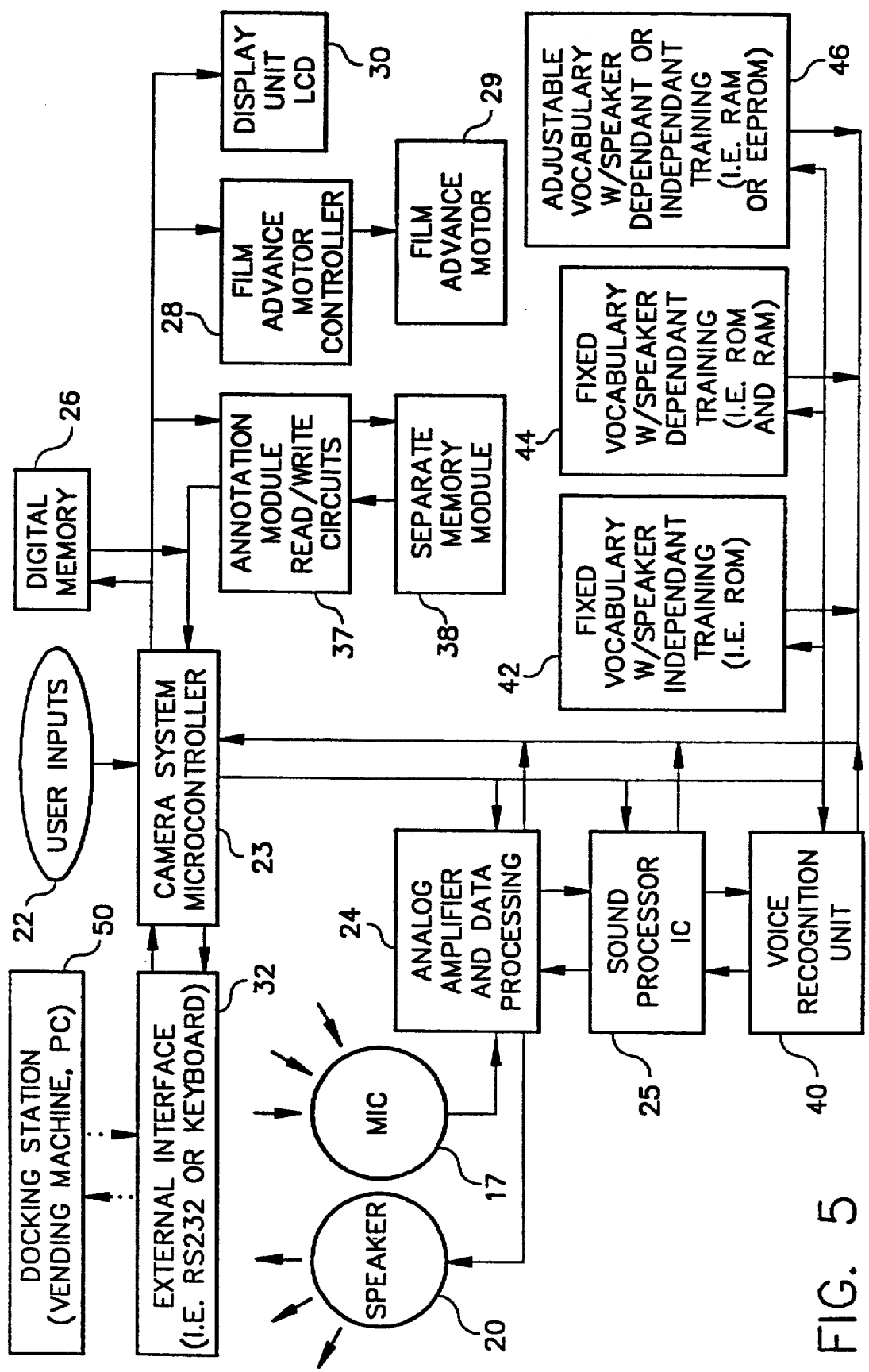
FIG. 5 is a schematic block diagram of a system for recording speech in a camera in accordance with the second embodiment of the invention.
Figure 6:
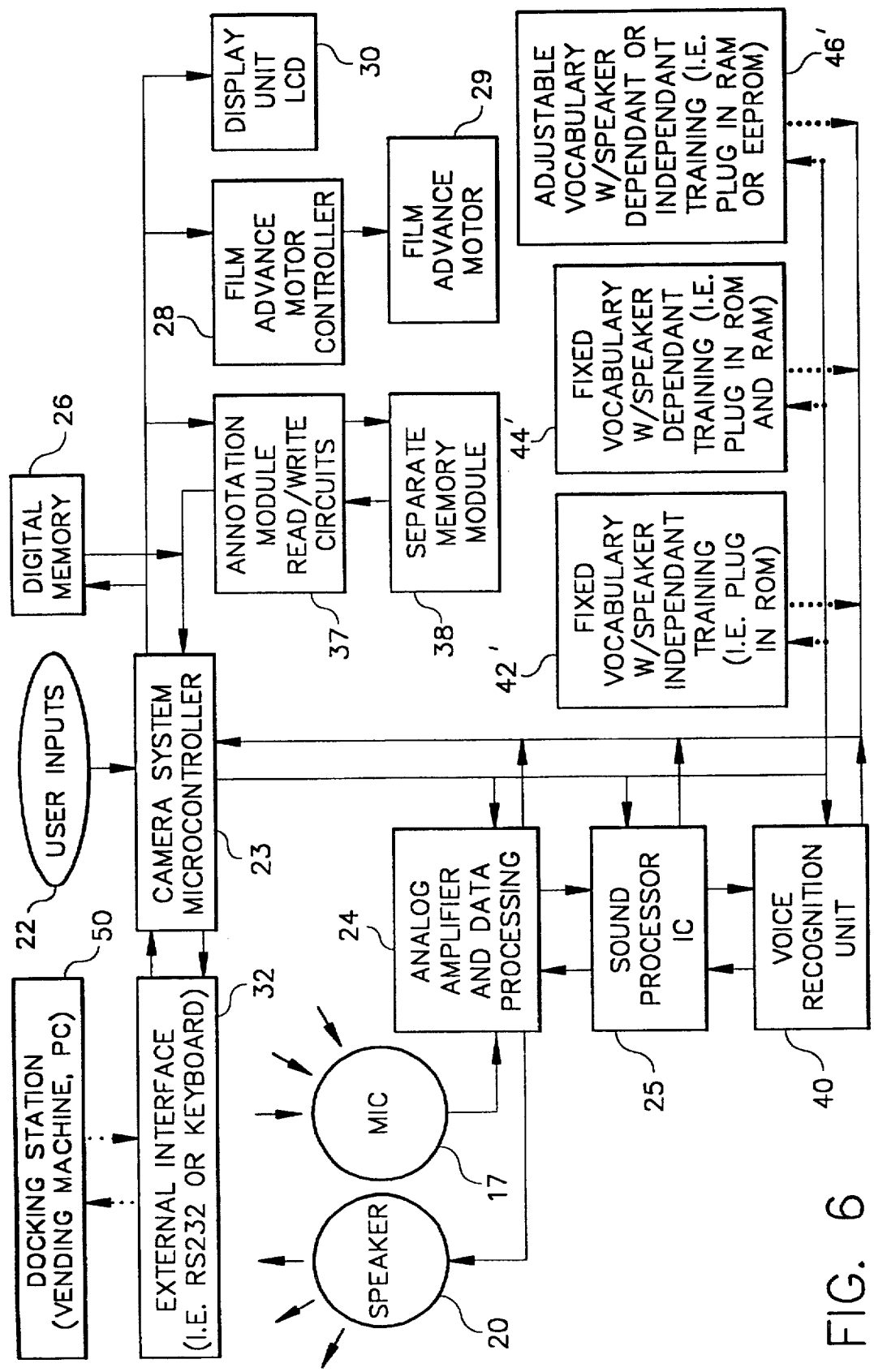
FIG. 6 is a schematic block diagram of a system for recording speech in a camera in accordance with a first variation on the second embodiment of the invention.

The camera circuits of FIGS. 3 and 4 differ in the type of vocabulary memories employed, as described in detail below. FIGS. 5 and 6 depict a further embodiment employing camera circuits similar to FIGS. 3 and 4 but for recording the voice recognized memories in separate memory modules, rather than on the MOF layer of FIG. 1, as described below. In all of the FIGS. 1–6, the source of or means for providing the vocabularies may take a variety of forms as listed above. FIGS. 7–11 illustrate possible voice recognition and storage methods employing the apparatus of FIGS. 1–6 for incamera voice recognition prior to permanently recording the messages.

Referring first to FIG. 1, a strip 10 of magnetically coated color negative film, 35 millimeters wide, useful in the present invention includes a base 11, various well-known photo-chemical layers 12 on one side of the base 11 and a virtually transparent MOF layer 13 on the other side. An anti-static and lubricating layer 14 overlies the magnetic layer 13. The film strip 10 includes perforations 15 along the film edge at regular intervals matching the pitch of a metering pawl in a camera adapted to use the film strip 10.

For purposes of recording data in the MOF layer 13, each frame of the film strip 10 may be formatted as shown in FIG. 1 and more fully described in commonly assigned U.S. Pat. No. 4,977,419, the disclosure of which is incorporated herein by reference. More specifically, the frame area is divided into a plurality of predetermined longitudinal track locations designated in the drawing as outermost tracks C0–C3 and innermost tracks F00–F29. As described more fully in the '419 patent, certain of the tracks may be reserved for recording of information in the camera using magnetic recording means included in the camera. In addition, other tracks may be reserved for use by the photofinisher. Additionally, the '419 patent indicates that certain of the tracks may be used for recording of audio information. Apparatus for magnetically recording information in the camera is more fully described in the '419 patent and is not repeated here except to the extent elements thereof are relevant to an understanding of the present invention.

Referring to FIG. 2, a camera 16 is schematically illustrated with a variety of features and components usable separately or in various combinations in the systems and methods described below. In a first embodiment of the invention, the camera 16 is specifically adapted to receive and function with film having the MOF layer 13 of FIG. 1. Camera 16 is provided with a built-in audio transducer, e.g. microphone 17, an internally mounted micro-chip 18, a magnetic recording head 19 and a miniature speaker 20. Camera 16 may also be provided with an LCD panel 30 for displaying various camera settings and conditions of the type well known in the art. In addition, the LCD panel 30 may display words that it has recognized to the user for confirmation of the recognition as described below. Various conventional user inputs 22 are also provided on the camera 16.

The camera 16 may also have an external interface 32 for receiving and transmitting vocabulary words to memory in micro-chip 18 or for reading out message words stored in such memory. For example, the external interface 32 may include an RS-232 port, so that camera memory in microchip 18 may be accessed through a computer based docking station 50 to load an adjustable vocabulary of words chosen by the user or obtained at a particular attraction or event by inserting the camera 16 into a docking station of a vending machine or the like. In the event that the camera is recyclable, the interface 32 may be employed by a docking station 50 operated by the photofinisher to read out the messages stored in camera on-board memory. In such a case, it would not be necessary that the camera also employ the MOF layer 13 on the film strip 10 or the cartridge related memory module described below to record or store the message the user wishes to appear on the prints.

Alternatively, the external interface 32 may comprise a keyboard on the camera of the type described above in reference to the '682 patent for keying in vocabulary words for voice recognition as one manner of storing the adjustable vocabulary words.

FIG. 2 also schematically illustrates a message memory module 38 that may be inserted into a slot or attached to a film cartridge 36 in the camera 16 so that the recording of the image frame related messages may be made in the memory module 38 rather than in the MOF layer of the film strip 10. Such a memory module 38 may take the form of the film cartridge end attached modules of commonly assigned, co-pending U.S. patent application Ser. No. 071,084 entitled ORIENTATION INDEPENDENT, DETACHABLE FILM CARTRIDGE, MEMORY MODULE filed on Jun. 4, 1993, in the name of J. David Cocca and Ser. No. 071,096 entitled ORIENTATION INDEPENDENT, DETACHABLE FILM CARTRIDGE, MEMORY MODULE filed on Jun. 4, 1993 in the name of Robert S. Bryant. Alternatively, the memory module into which the messages are recorded may be a plug-in IC card of the type described in the above-referenced '700 patent or the cartridge mounted ROM-ICs described in the above-referenced '310 patent or any other convenient form.

Finally, FIG. 2 also shows a separate vocabulary memory card 34 that may be inserted into a slot connector in the camera body for loading a particular fixed vocabulary. The fixed vocabulary memory card 34 may take the form of a ROM-IC card of the type described in the above-referenced '700 patent. Again, the vocabulary memory card 34 may be vended to the user at an event or attraction of photographic interest to customize and expand the vocabulary of fixed words that may be recognized for a particular event or attraction of photographic interest. Ideally, the fixed vocabulary memory card 34 would have speaker independent training so that the purchaser would not have to spend the time training the words for recognition.

It will also be understood that the memory card 34 may also constitute or include adjustable memory so that a user could store adjustable words in the card using the camera to write into and read from the memory in the card or using a further system for writing words into the memory card. In such a case, speaker dependent training would more likely be required.

It should be noted that the functions of the vocabulary memory card 34 and the message memory module 38 could be combined to operate as the memory in which recognized voice messages are stored in the same manner as the memory module 38 or the MOF layer 13 as described above and to provide a vocabulary for the voice recognition unit. The combination of the message memory module 38 and vocabulary memory card 34 as both the source of the vocabulary words and the repository of the messages recorded for each image frame as the recognized voice digital data has certain advantages. The recognized voice digital data can be coded to the memory addresses for the vocabulary words, rather than repeating the code for the word itself.

In all of the above described embodiments, the message memory module 38 (to be attached to a cartridge or formed in the film cartridge) and/or the memory card 34 may both be purchased or provided with the purchase of a film cartridge from a vending machine or over the counter at an event or attraction of photographic interest. The memory card vocabulary in either case would contain words useful to recognize messages expected to be recorded at that attraction or event.

Many of the means and methods for providing a vocabulary memory or for recording the voice recognized messages in memory supplied with the film cartridge to the photofinisher described in the preceding paragraphs are depicted redundantly in FIG. 2. Similarly, the embodiments of FIGS. 3–6 include redundant vocabulary memory sources as described below. It will be understood that not all of these means or methods are necessarily present in a single camera.

Referring to FIGS. 3 and 4, there is shown an expanded block diagram of a first embodiment of the circuits and components or system included in camera 16 for recording voice recognized messages in MOF layer 13. The circuits of FIGS. 3 and 4 are for the most part embodied in micro-chip 18, except for the memory units 42, 44 and 46.

User inputs 22 comprise buttons or switches which condition the camera system microcontroller 23 to initiate and control the various operating functions of the camera, including the sound recording and playback functions of the present invention, as well as the conventional camera auto focus and auto exposure functions, shutter release, film advance and the like.

Microphone 17 and speaker 20 are coupled to analog amplifier and data processing circuit 24 to input and play back the voiced message in one mode of operation of the circuit. A sound processor integrated circuit (IC) 25 serves to convert analog signals input from microphone 17 into coded digital information suitable for storage in an on-board digital memory 26 and for converting the stored digital information into analog signals suitable for playback through speaker 20. Sound processor 25 may be a Texas Instruments TMS3477, and memory 26 may be a random access memory (RAM) such as a Hitachi HM 628128.

Another function of on-board memory 26 is to serve as a temporary storage for the message associated with an individual exposed image frame after voice recognition is completed and prior to recording the message on the MOF layer 13 of film strip 10. For this purpose, memory 26 is coupled by the microcontroller 23 in the "write" mode to film read/write interface circuits 27 to record the stored audio data onto the MOF layer 13. A film advance motor controller 28 operates at appropriate times to cause film advance motor 29 to advance the film 10 in either the frame-to-frame direction or in the film prewind/rewind direction, the latter depending on the nature of the camera involved. The messages in memory 26 are recorded in the MOF layer tracks during such film advancement.

Turning to the vocabulary memory units 42, 44 and 46 depicted in FIG. 3, the voice recognition of the spoken words of the message is effected by the voice recognition unit 40 under the control of the microcontroller 23. The voice recognition unit 40 is coupled to stored vocabulary words contained in fixed vocabulary memory units 42 or 44 and the adjustable vocabulary memory unit 46.

The memory unit 42 stores speaker independent training patterns for the fixed vocabulary and, in FIG. 3, may be on-board ROM that is loaded at manufacture of the camera and cannot be changed. By contrast, the fixed alternative vocabulary memory unit 44 employs speaker dependent training for the fixed vocabulary through combined on-board ROM and RAM. The fixed vocabulary words are stored in ROM, and the speaker trained word patterns for each word are stored during the training routine in RAM to be recognized in the later use of the camera voice recognition function.

Adjustable vocabulary memory unit 46 may be on-board RAM or EEPROM and may employ either speaker dependent or independent training in the contexts described below. In a first variation, the adjustable vocabulary word memory unit 46 is provided in order to allow the user to store word sets of his or her choice that may relate to persons or relate to the taking of photographs at various attractions or events. The adjustable vocabulary memory unit 46 of FIG. 3 is loaded with adjustable vocabulary words through the data interface 32. In this case, the adjustable vocabulary words would require speaker dependent training.

The data interface 32 may include a port for a cable from a personal computer, so that the adjustable vocabulary words may be inputted via the computer keyboard or memory. In cameras equipped with a miniature keyboard, e.g. that shown in the above-referenced '149 patent, the vocabulary words may be keyed into the adjustable vocabulary memory unit 46 through the keyboard on the camera body and displayed to the user on the LCD display unit 30. In a further keyboard system for entering letters of a word of the type used in the Magnavox® "Smart Talk" VCR remote control unit, a "joy stick" is used to select letters from an alphabet appearing on the LCD display to spell out the words of a vocabulary. The speaker dependent training routine as described above may follow loading of the word or words in any of these manners. In this way, the user may input words into the adjustable vocabulary memory unit 46 before the camera is used for any specific event.

In a second variation, the camera may be fitted into a docking station 50 of a vending machine or the like to make a connection to the external interface 32 port for data transfer via the RS-232 standard from memory in the vending machine. For example, such vending machines may be provided to dispense film cartridges at a theme park and to down load adjustable word vocabularies. The camera interface 32 may be inserted into the docking station 50, and the adjustable vocabulary memory unit 46 may be loaded when the film cartridge is dispensed.

In this case, the down loaded adjustable vocabulary may include speaker independent training patterns for the adjustable vocabulary that is loaded. If the vocabulary is speaker dependent, then the user would proceed to complete the speaker dependent training described above after loading of the words through the interface 32.

In a further simplification of the system depicted in FIG. 3, only a single adjustable memory unit 46 may be provided in the camera into which the entire vocabulary word set is loaded through the data interface 32 by any of the above described means and methods. In this case, no distinction would be drawn between the fixed and adjustable vocabulary word sets, except that a portion of the RAM or EEPROM memory locations might be loaded through a docking station 50 and interface 32 with event or attraction related word sets (speaker independent or dependent), and other memory locations might be loaded by the user through the interface 32. The memory locations may be separately designated or tagged so that the adjustable vocabulary entered by the user is not written over during a subsequent down load from the docking station 50.

Turning to the embodiment of FIG. 4, the system depicted differs from FIG. 3 in the types of memory units provided. In this system, the plug-in memory units 42', 44' and 46' may each comprise part of a single vocabulary memory IC card 34, or separate vocabulary memory IC cards 34 may be provided for each memory unit 42' or 44' and 46'. In other words, in one variation, a single, insertable and replaceable memory card 34 has within it ROM and RAM or EEPROM with memory locations dedicated to the storage of word patterns for the fixed and adjustable vocabulary words that are schematically depicted as the plug-in memory units 42', 44' and 46'. In the other variation, the camera may receive one of the plug-in fixed vocabulary memory units 42' or 44' or 46' as an IC card 34 that is inserted into a camera slot. The same camera user may be able to program separate plug-in adjustable vocabulary memory units 46' for different situations or uses of the camera. Multiple users of the same camera may be able to program separate plug-in adjustable vocabulary memory units 46' and keep them for their own use of the camera. The camera may have more than one slot for receiving more than one IC card, and the slot or slots are connected by a data bus to the microcontroller 23.

FIGS. 5 and 6 are alternative embodiments of the invention to FIGS. 3 and 4, respectively, wherein the recording of the image frame related messages is in the separate memory module 38 rather than in the MOF layer 13 of the film strip 10. Such a memory module 38 is schematically illustrated in FIG. 2 as an alternative storage format to the MOF layer 13 on the film strip 10 of FIG. 1 and described above. In each case in FIG. 6, a portion or all of the memory units 42', 44' and/or 46' may be physically incorporated into the separate memory module 38. For example, the adjustable memory unit 46' of FIG. 6 may be incorporated into a memory module that is sold at an event or attraction where film cartridges are sold over the counter or vended from a vending machine.

The general operation of a camera embodying any of the above described embodiments and variations after the vocabularies are loaded, and when it is desired to record sound in association with taking a picture, is now described. The camera user selects a sound recording mode via a user input selector switch 22 that causes the camera system microcontroller 23 to set the digital memory to the "write" mode and then enables the analog amplifier and data processing circuit 24 for audio recording. Assuming that the user desires to record image-related audio, the user talks into the camera microphone 17 to identify the scene with appropriate information, e.g. picture taking location, people in the scene, or other information. The user may also verbally initiate recording of information originating in or under the control of the camera itself, e.g. date and time (from an internal digital clock), f-stop, shutter speed, frame number, and other camera operations. The data processing circuit 24 and sound processor IC 25 convert the incoming analog signal to coded digital data which is then recorded in the digital memory 26 in this manner before, during or recorded into memory 26. Audio may be after the picture-taking event as described further below.

Once having recorded the audio message in memory 26, it is then possible to review the message for content via speaker 20 in the camera. To do this, the user selects the "review" mode by means of a user input 22 which causes the microcontroller 23 to set the memory 26 to the "read" mode thereby enabling the sound processor 25 and the analog amplifier and data processing circuit 24 to play back audio through speaker 20. If the recorded message is not satisfactory, the user can easily change it by simply repeating the recording process described above.

Figure 7:
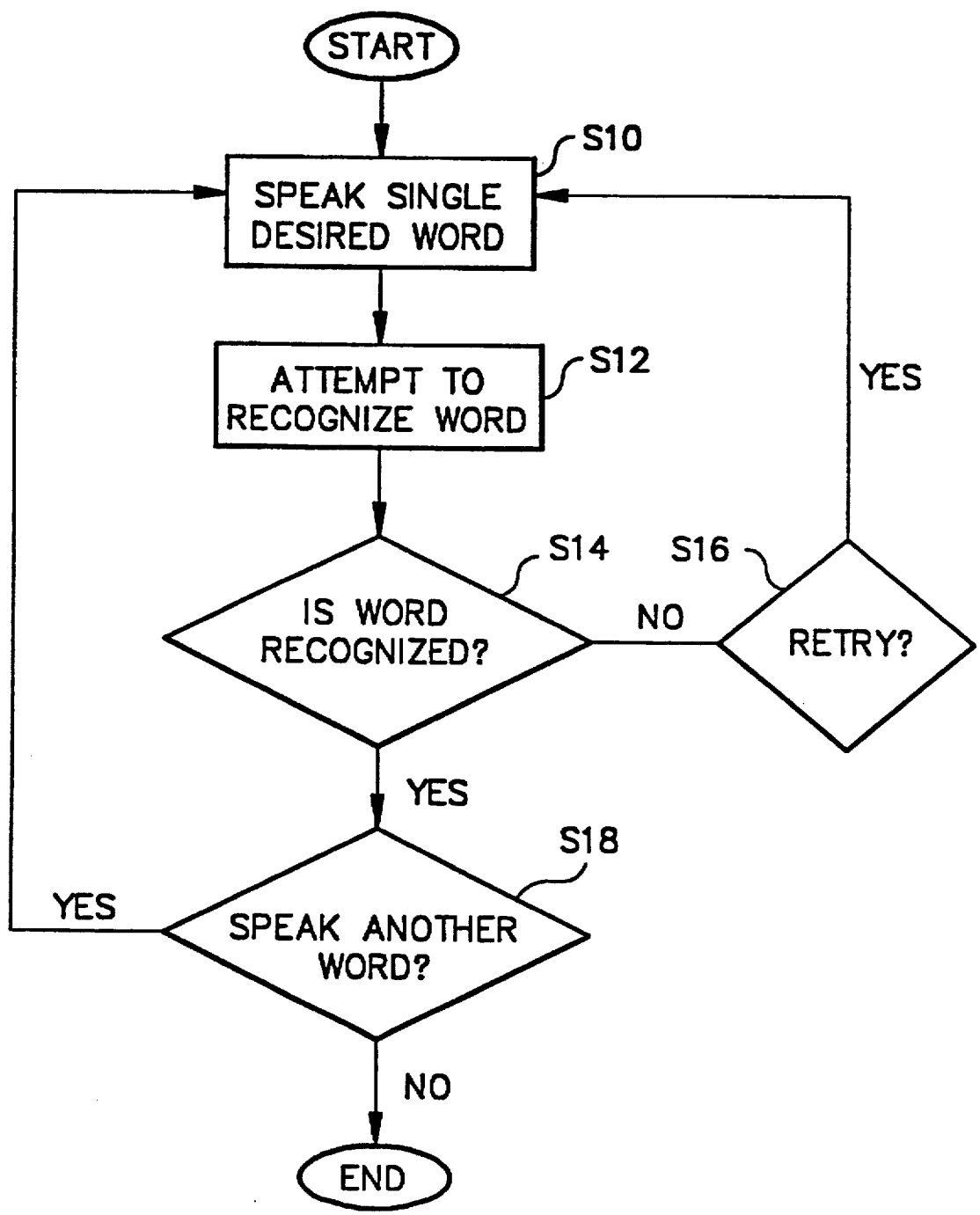
FIG. 7 is a flow chart of the camera based voice recognition steps taken to accurately store and record each word of a message voiced by the user.

During this composing and editing process, in accordance with one aspect of the present invention, each spoken word of the message is compared in the voice recognition unit 40 to the word patterns stored in fixed vocabulary memory units 42/42' or 44/44' and the adjustable vocabulary memory unit 46/46', as illustrated in the voice recognition flow chart of FIG. 7. At the start, the user speaks a single word in step S10. The voice recognition unit 40 makes the comparison of the digitized, voiced word to the stored vocabulary of digitized words and locates the closest match in step S12. The word may be recognized in step S14 in several ways. In one way, the closest match word may be displayed on the LCD panel 30 in a display mode, or the matched word may be audibly played back by the speaker 20 using speech synthesis techniques well known in the art. If the displayed or played back word is not correct, the user may indicate non-recognition of the word through a user input 22 or by voicing a simple, unambiguous negation command that may be recognized only in the display mode in step S16. A further match may then be attempted by the voice recognition unit 40 or the user may interrupt the recognition process to again voice the word or a different word in step S10 and repeat the process. The user indicates acceptance of the word displayed through a user input 22 or by voicing a simple, unambiguous affirmation command that may be recognized only in the display mode in step S14. The micro controller 23 responds by storing the digitized word from the memory unit 42, 44 or 46 into the digital memory 26 and prompting the user to speak another word in step S18. The display and acceptance of the words of the message may be conducted word by word until the entire message is recognized and stored in memory 26. As described hereafter, the accepted message is recorded in the MOF layer 13 or the memory module 38 before the film cartridge is removed from the camera and provided to the photofinisher.

Figure 8:
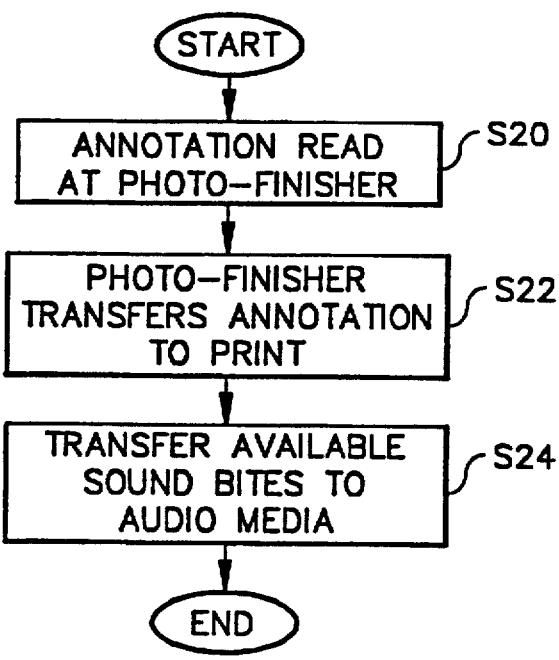
FIG. 8 is a flow chart of the steps of the transfer to print operation undertaken by the photofinisher.

FIG. 8 illustrates the transfer-to-print process of translating the voice recognized and stored or recorded message into an annotation on the border of a print made from the image frame. At step S20, the recorded message or annotation is read out from either a memory module or the MOF layer of the film strip and temporarily stored. The annotation is transferred to the photosensitive print border by an alpha-numeric character print head positioned in the photographic printer to make the exposure of the annotation during the passage of the print paper through in the photographic printer in step S22.

The photofinishing system employed to transfer the message to the print is similar to that depicted in FIG. 4 of the above incorporated '472 patent. In that FIG. 4, the messages recorded in the MOF layer tracks for each image frame are read out and converted to a bar code or blister code format that is imprinted on the print. In the present case, the recorded messages are read out from either the MOF layer tracks or the memory module provided to the photofinisher with the film cartridge, converted (if necessary) to an alpha-numeric character font, and directly printed on the print in any convenient place using any conventional character printer.

The read out of the messages recorded in the MOF layer tracks may be accomplished by the head and playback circuits depicted in FIG. 4 of the '472 patent as the film strip is advanced, and the digitized messages are converted by the data converter into a format usable with the bar code or blister code printer. Rather than the bar code or blister code printer, a conventional alphanumeric character printer head would be employed to print the annotation on the print paper in accordance with the present invention.

In order to accommodate the alternative memory module 38, the processor of FIG. 4 of the '472 patent may be provided with a slot for reading out the data stored in the memory module and temporary memory for storing the read out data and applying it to the data converter. In the case where the camera is provided to the photofinisher with the film strip and cartridge in it, the stored messages may alternatively be read out through a docking station 50 coupled to the processor block of the printer and making connection with the external interface 32 of the camera. In any case, the data including the messages and the image frame identification would be read out, stored, converted to the printer character font format, and printed on the print made from the identified image frame.

While the recording of the voice recognized messages on certain tracks of the MOF layer or in the memory module have been emphasized in certain of the above-described embodiments, it will be recognized that the analog voice message may also be separately stored and recorded in adjacent tracks or memory for a variety of reasons. For example, the notes recorded at the time of taking a photo, and later used to compose the edited message to appear as the print annotation may be retained for cross-checking. The aural notes or composed message may be retained for playback as a "sound bite" by other means in association with the prints or otherwise. At step S24 the sound bites, if recorded, may be transferred to a recording medium, e.g. a tape cassette to be provided to the user with the annotated prints made from the negatives and the recorded messages.

Figure 9:
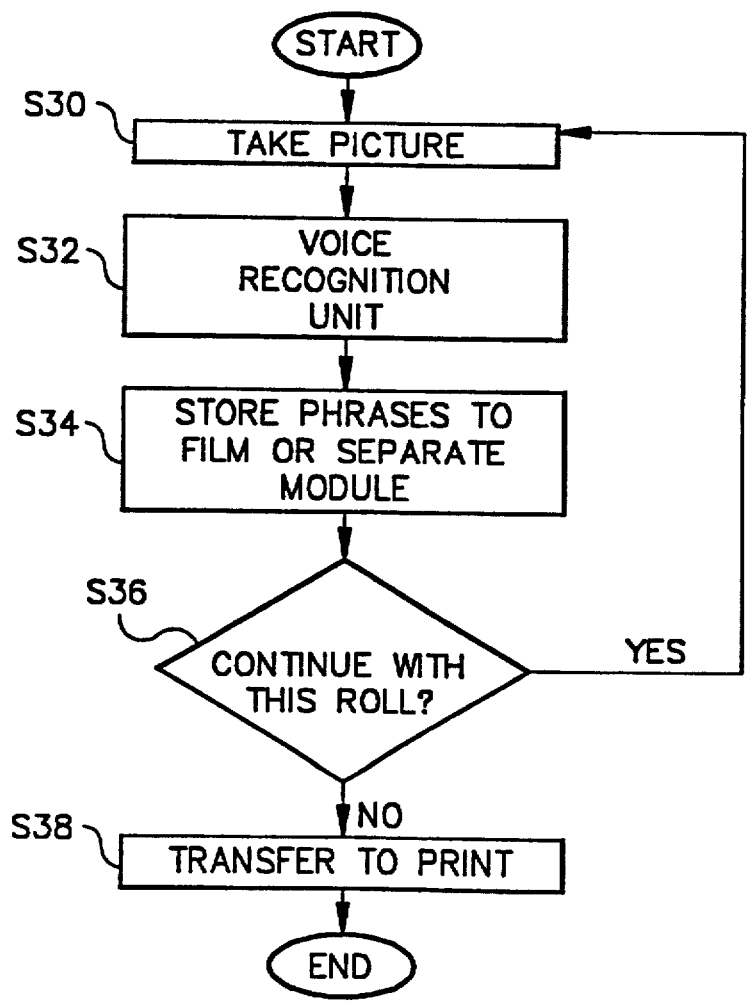
FIG. 9 is a flow chart of the combined steps of recording a message in real time relation to the exposure of each image frame and the finishing of the prints with the message appearing as an annotation on the print.

FIG. 9 illustrates the combination of the steps of the voice recognition method of FIG. 7 and the transfer-to-print method of FIG. 8 in one fashion for recording messages with the exposure of each image frame of a film strip. In step S30 the camera is used to make an exposure of an image frame. The camera alerts the user, or the user simply proceeds to then invoke the method of FIG. 7 in step S32. When all words of the message are recognized in step S18, the message may be stored as described as follows in a memory module 38 with the image frame number or by recording the digitized words on the MOF layer in step S34.

Following the taking of a picture and before the film strip is advanced to the next image frame by the film advance motor 29, the camera system microcontroller 23 checks the status of the memory 26. If there is audio stored in the memory, it sets the memory to the "read" mode to pass the data from the memory 26 to the film read/write interface circuits 27 or the annotation module read/write circuits 37. In the system employing the MOF layer recording technique described in reference to FIGS. 1–4, the microcontroller 23 activates motor controller 28 to cause motor 29 to initiate film advance to the next frame. The data transferred from the memory 26 to the recording interface circuits 27 is recorded on certain tracks of the MOF layer 13 during the film strip advance. Once the data is recorded on the MOF layer, microcontroller 23 sets the status of memory 26 to "empty", thus preparing the memory 26 for the next recording event.

In the embodiments of FIGS. 5 and 6, it is not necessary to synchronize the storage of the image frame messages in the memory module 38 with movement of the image frames.

Instead, the messages may be transferred, along with the frame identification, into the separate memory module 38 when the user indicates that each message is complete. Or the messages may be retained in memory 26 for later playback, revision and storage at any time before the memory module 38 is removed from the camera. In a further variation described below, recording of the edited messages on the MOF layers of the filmstrip image frames may also be done at a later time by storing the user's notes in relation to each image frame in memory 26.

In step S36, the decision is made to continue taking pictures on the film strip in the camera. When the film strip is fully exposed or it is decided to stop taking pictures, the user provides the film strip and associated memory module (if any) or the camera to the photofinisher to invoke the transfer-to-print method of FIG. 8 in step 38. Thus, in the simplest use of the camera system embodiments and process described above, the annotations on the resulting prints contain messages that were recorded in association with each image frame, wherein each word of the voiced message is subjected to voice recognition in the camera.

Figure 10:
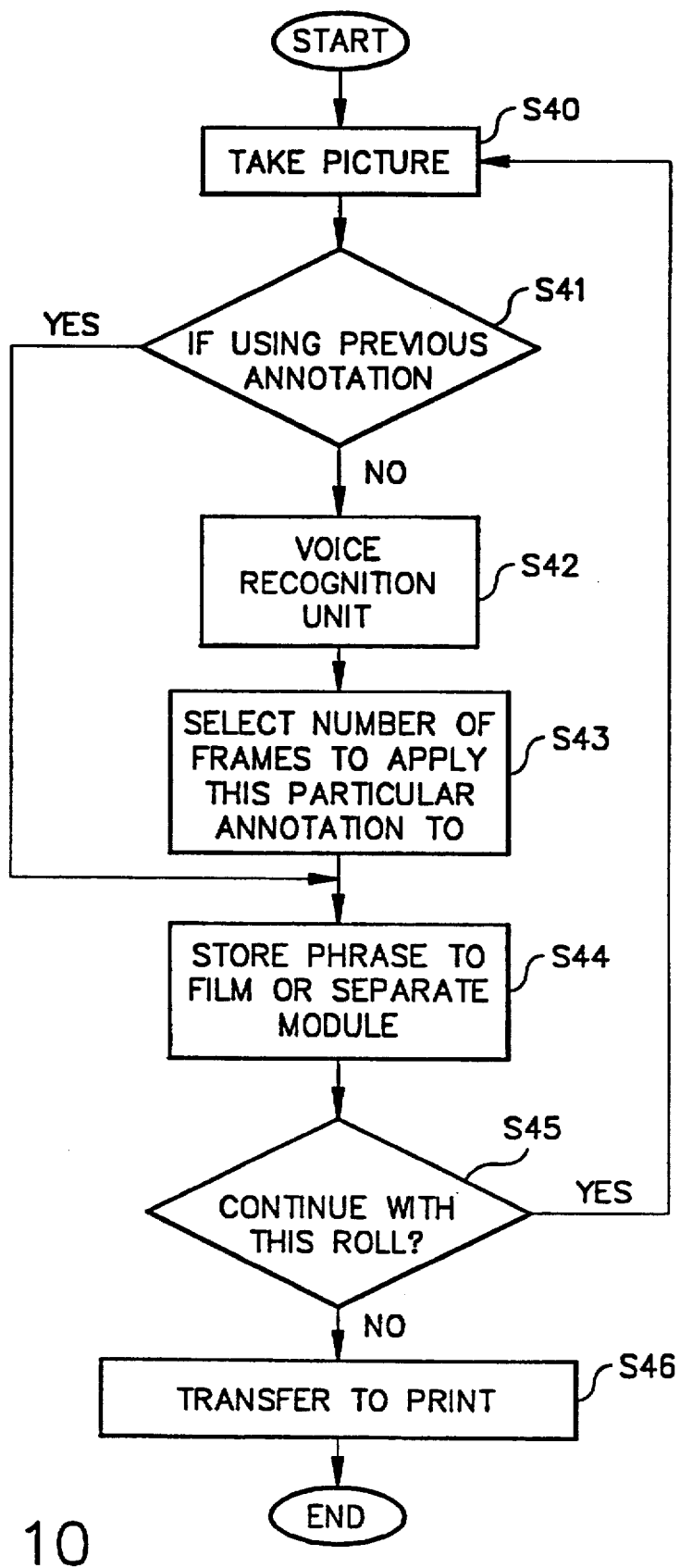
FIG. 10 is a flow chart of the combined steps of recording a message using terms common to a series of exposures and the finishing of the prints with the common terms appearing as an annotation on each print.

FIG. 10 illustrates a method involving the voice recognition and transfer to print steps of FIGS. 7 and 8 for selectively repeating the same message to appear as the same annotation on a series of prints made from a series of image frames. For example, given the time it may take to prepare and voice in messages to be recorded, it may be desirable to compose an annotation to appear on a number of prints that are to be taken (or may have been taken already) related to the same event or attraction being photographed.

The process of FIG. 10 is invoked each time that an exposure is made. At step S40 the user takes a picture, and at step S41 the stored algorithm indicates if an earlier stored message is to be used again depending on commands entered previously at step S43. If "no", then the voice recognition process of FIG. 7 is invoked in step S42. At step S43, the user may input the number of succeeding image frames to store the message with by activating a user input 22 or voicing a unique command that is recognized by the voice recognition unit 40. At step S44, the message is stored or recorded in a manner previously described. The decision is made at step S45 to continue with the exposures of the film strip as described above, and, if so, then the process starts over with the next exposure at step S40. If not, then the transfer-to-print process of FIG. 8 is invoked at step S46 as described above.

If such an entry to apply the same annotation to the next image frame has already been made in step S43, then the "yes" response at step S41 is satisfied. The same message is then stored with respect to that image frame at step S44 and the process continues as described above. It will be recognized that the order of the steps of FIG. 10 may be altered to accomplish the same result, by having the user indicate at step S41 that a previously stored message is to be used again in association with the most recently exposed (or to be exposed) image frame. Moreover, it would be possible to store not only a previously voice recognized message as well as adding a further message subjected to the voice recognition process for that image frame.

Figure 11:
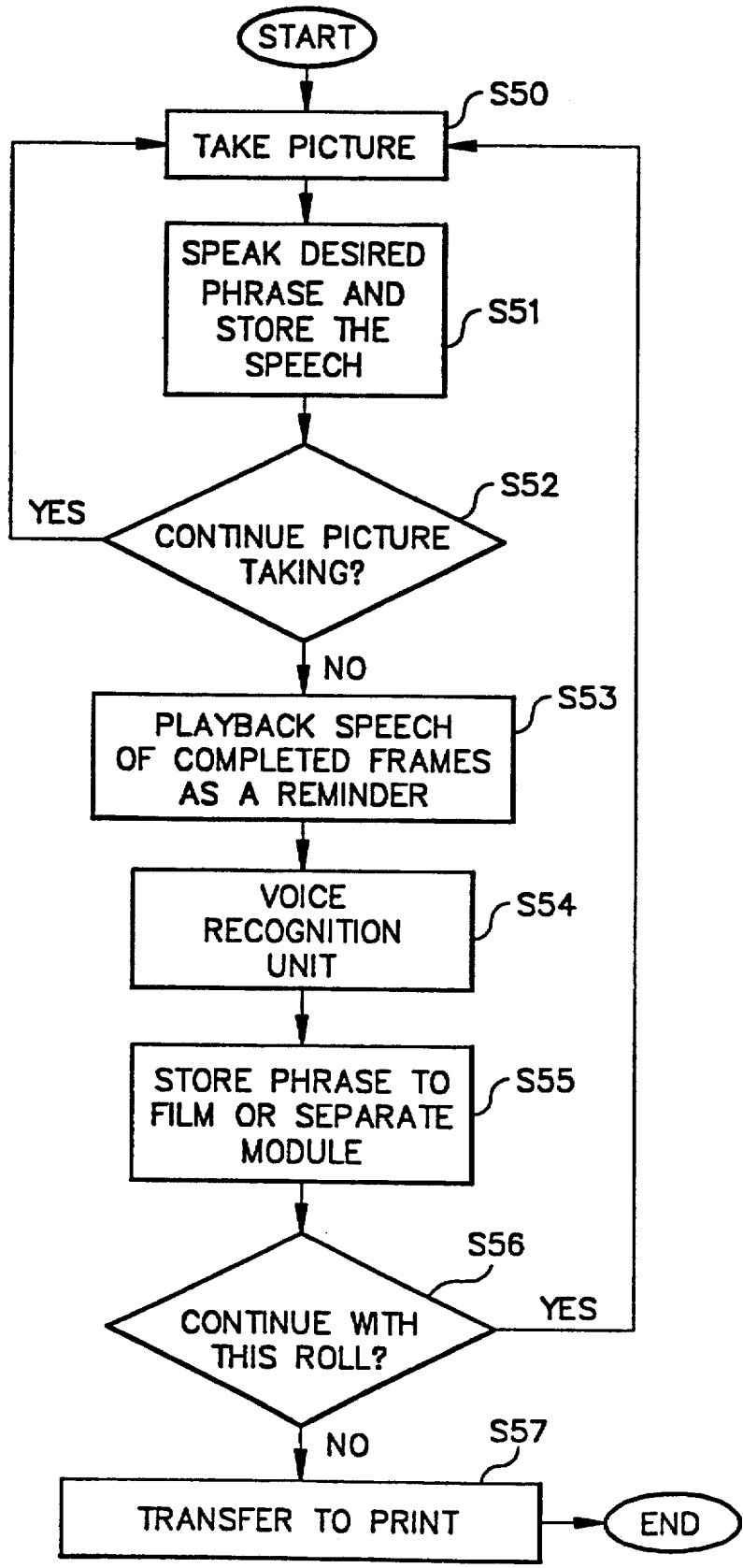
FIG. 11 is a flow chart of the combined steps of recording a voice message temporarily for each image frame and editing and re-recording the edited messages at a later time and the finishing of the prints with the message appearing as an annotation on the print.

Turning now to FIG. 11, it depicts a further method for initially temporarily storing voiced-in messages or notes for each image frame and then at a later time, reproducing the messages, composing the annotation to appear on the print, and recording or storing the composed message using the voice recognition process of FIG. 7 and the transfer-to-print process of FIG. 8. Storing voiced-in-messages in the camera requires much less time during picture taking than if voice recognition were accomplished at the time of picture taking. The method of FIG. 11 is most readily implemented in the embodiments of FIGS. 5 and 6 which is first described as follows. At step S50, the picture is taken by the user, and a descriptive note or phrase is voiced in for storage without voice recognition in memory 26. When all image frames are exposed, or it is otherwise indicated by the user that exposures are no longer to be made, or that the user now wishes to compose and store or record messages for the image frames exposed previously, at step S52, the temporarily stored voiced notes are played back at step S53. The storage and playback may be phonetic, since the user is likely to be able to recognize the words spoken even if the words played back are somewhat flawed. As each image frame note is played back, the user may thereby be reminded as to the content of that image frame and proceed at step S54 to invoke the voice recognition process of FIG. 7 and compose the message to appear as the print annotation. At step S55, the composed and recognized message is again stored in a memory module 38 as described above.

At step S56 the decision is made to continue with the exposures of any remaining image frames of the film strip as described above, and, if so, then the process starts over with the next exposure at step S50. If not, then the transfer-to-print process of FIG. 8 is invoked at step S57 as described above. Thus, the use of the camera may be interrupted at any time to play back the stored notes, edit and compose the message, and store or record it, at a time later than the time of exposure and whether or not all image frames of the film strip are exposed.

In respect to the embodiment of FIGS. 3 and 4, the above method may be followed by temporally storing the notes in memory 26 in step S51 as each image frame is exposed. Then, preceding step S53, it would be necessary to rewind the film strip back to the first image frame that does not have a message previously stored in the MOF layer 13 in accordance with step S55. Then steps S53 and S54 would be followed as described above to prepare each message for recording in the MOF layer 13 of the associated image frame. Recording would then take place as the film is advanced to the nest image frame.

In a further variation, the film advance motor 29 of the camera system may be reversible to allow the film strip to be advanced in a first direction to effect the temporary recording of the voiced-in notes in MOF layer tracks as each image frame is advanced before or after the exposure at step S51. Then, at step S53, the film advance may be reversed to rewind the film strip back to the first image frame having a message to be edited. The film advance motor 29 is operated to advance the image frame and play back the recorded notes for that image frame for the user to listen to. After composition and voice recognition of the message, the film advance motor 29 may be again reversed to rewind the film strip to the starting position and to then advance the film strip again while recording the message. This process may be repeated for each image frame until all messages are recorded.

Although the present invention has been fully described with reference to the preferred embodiments thereof, many modifications and variations thereof will be apparent to those skilled in the art without departing from the spirit and scope thereof.

PARTS LIST FOR FIGS. 1–11 film strip 10
base 11 photo-chemical layers 12
virtually transparent MOF layer 13
anti-static and lubricating layer 14
perforations 15
camera 16
microphone 17
internally mounted micro-chip 18
magnetic recording head 19
miniature speaker 20
user inputs 22
camera system microcontroller 23
analog amplifier and data processing circuit 24
sound processor integrated circuit (IC) 25
on-board digital memory 26
film read/write interface circuits 27
film advance motor controller 28
film advance motor 29
LCD panel 30
external interface 32
vocabulary memory card 34
film cartridge 36
annotation module read/write circuits 37
message memory module 38
voice recognition unit 40
first fixed vocabulary memory unit 42, 42'
second fixed vocabulary memory unit 44, 44'
changeable or adjustable vocabulary memory unit 46, 46'
docking station 50

We claim:

1. In a photographic camera including an optical lens, a photographic filmstrip transport mechanism for advancing the filmstrip in a path of travel to and through an image frame exposure gate with respect to said optical lens, and an exposure system for making an exposure of the filmstrip image frame in the exposure gate, apparatus for recording a voice message composed by the camera user related to the exposure made or to be made for playback in conjunction with making prints from the photographic images captured in the image frames of the filmstrip to provide for the printing of the voice message therewith comprising:

speech input means into which a camera user may speak words of the message to be stored with respect to the filmstrip image frames;

sound processing means for processing the words spoken into the speech input means as voice digital data;

means for providing reference voice digital data corresponding to a reference word vocabulary;

speech recognition means for comparing the processed voice digital data to the reference voice digital data and recognizing processed voice digital data corresponding to the reference voice digital data while rejecting voice digital data not finding correspondence with the reference voice digital data;

message memory means having memory locations related to each image frame of the filmstrip for storing recognized voice digital data; and means for storing the recognized voice digital data in said message memory means, wherein said means for providing reference voice digital data corresponding to a word vocabulary further comprises:

first vocabulary memory means for storing a fixed vocabulary of words that cannot be altered by the user; and second vocabulary memory means for storing a adjustable vocabulary of words selected by the user, wherein said first vocabulary memory means comprises a read only memory stored with said fixed vocabulary from which said fixed vocabulary may be read by said speech recognition means; and said second vocabulary memory means comprises a read and write memory into which said adjustable vocabulary may be written in and from which said adjustable vocabulary may be read by said speech recognition means;

and further comprising interface mean for receiving said adjustable vocabulary from an external source and for writing said adjustable vocabulary into said second vocabulary memory means.

2. The recording apparatus of claim 1 wherein:

said memory means comprises a virtually transparent magnetic layer on said filmstrip having a plurality of longitudinally extending parallel tracks therein; and said storing means further comprises a recording head arranged in said path of travel of said filmstrip and means for effecting magnetic recording of said recognized voice digital data in selected tracks for playback in conjunction with making prints from the photographic images captured in the image frames of the filmstrip and a film write interface circuit responsive to the for energizing the recording head.

3. The recording apparatus of claim 1 wherein:

said filmstrip is attached at one end to a filmstrip cartridge and is adapted to be enclosed within said cartridge upon completion of exposure of all image frames for removal from said camera for transfer to a photofinisher to make prints therefrom; and said memory means comprises a memory module associated with the filmstrip cartridge for storing said recognized voice digital data.

4. The recording apparatus of claim 3 wherein said memory module is detachable from said cartridge.

5. The recording apparatus of claim 1 particularly adapted to receive said adjustable vocabulary from an external source associated with an event or attraction of photographic interest through said interface means and wherein said source may further comprise a camera docking station for receiving said camera and coupling said interface means to an input means.

6. The recording apparatus of claim 5 wherein:

said input means comprises a user operated keyboard for keying in the alphanumeric characters of words of particular interest to the user; and said interface means is operable to convert and store the alphanumeric characters of keyed in words as said adjustable vocabulary.

7. The recording apparatus of claim 5 wherein:

said input means comprises a vending machine operable on user selection to down load a data set of words of particular interest to an event or an attraction of interest to be photographed and selected by the user; and said interface means is operable to convert and store the down loaded data set of words as said adjustable vocabulary in said second vocabulary memory means.

8. The recording apparatus of claim 1 wherein:

said first vocabulary memory means comprises a read only memory in a detachable, interchangeable memory card stored with said fixed vocabulary to be compared with a spoken word by said speech recognition means; and said apparatus further comprises:
   card receiving means in said camera for receiving said read only memory card for making connection with said speech recognition means.

17

9. The recording apparatus of claim 1 wherein:
said second vocabulary memory means comprises a read and write memory in a detachable, interchangeable memory card stored with said adjustable vocabulary to be compared with a spoken word by said speech recognition means; and
said apparatus further comprises:
card receiving means in said camera for receiving said read and write memory card for making connection with said speech recognition means.

10. The recording apparatus of claim 1 wherein:
said first vocabulary memory means comprises a read only memory stored with a portion of said fixed vocabulary with speaker independent training and a further read only memory stored with a further portion of said fixed vocabulary and a read and write memory for speaker dependent training of said further portion of said fixed vocabulary to be compared with a spoken word by said speech recognition means.

11. The recording apparatus of claim 1 further comprising:
means for indicating the un-recognized word of processed voice digital data to the speaker and for prompting the speaker to repeat the corresponding un-recognized word.

12. The recording apparatus of claim 11 further comprising:
means for playing back and audibly reproducing the recognized and stored voice digital data for each image frame; and
means operable by the speaker for editing the stored voice digital data by speaking the words of the message desired to replace the processed and stored voice digital data into said speech input means, whereby the spoken words are again subjected to processing and speech recognition.

13. The recording apparatus of claim 12 further comprising:
means operable by the speaker to indicate the acceptance of the edited words of the message; and
wherein:
said storing means is responsive to the acceptance indication for storing the voice digital data corresponding thereto in said memory means.

14. The recording apparatus of claim 11 further comprising:
means for displaying the words spoken one at a time in a visible display; and
means operable by the speaker for editing the stored voice digital data by speaking the words of the message desired to replace the processed and stored voice digital data into said speech input means, whereby the spoken words are again subjected to processing and speech recognition.

15. The recording apparatus of claim 14 further comprising:
means operable by the speaker to indicate the acceptance of the edited words of the message; and
wherein:
said storing means is responsive to the acceptance indication for storing the voice digital data corresponding thereto in said memory means.

16. The recording apparatus of claim 1 further comprising:
means for playing back and audibly reproducing the recognized and stored voice digital data; and

18 means operable by the speaker to erase the stored voice digital data and repeat the speech input in an editing of the message to be printed in relation to the image frame.

17. The recording apparatus of claim 16 further comprising:
means operable by the speaker to indicate the acceptance of the edited words of the message; and
wherein:
said storing means is responsive to the acceptance indication for storing the voice digital data corresponding thereto in said memory means.

18. The recording apparatus of claim 16 further comprising:
means operable by the speaker for editing the stored voice digital data by speaking the words of the message desired to replace the processed and stored voice digital data into said speech input means, whereby the spoken words are again subjected to processing and speech recognition.

19. In a photographic camera including an optical lens, a photographic filmstrip transport mechanism for advancing the filmstrip in a path of travel to and through an image frame exposure gate with respect to said optical lens, and an exposure system for making an exposure of the filmstrip image frame in the exposure gate, a method of recording a voice message related to the exposure made for reproduction in conjunction with making prints from the photographic images captured in the image frames of the filmstrip, including the printing of the associated message, comprising the steps of:

processing spoken words of a message to be stored with respect to each exposure of an image frame into a camera speech input means at the time of making the image frame exposure as voice digital data;

providing reference voice digital data corresponding to a word vocabulary;

in a speech recognition operation, comparing the processed voice digital data to reference voice digital data and recognizing processed voice digital data corresponding to the reference voice digital while rejecting voice digital data not finding correspondence with the reference voice digital data; and storing the recognized voice digital data into memory locations related to each image frame of the filmstrip of a memory means detachable from the camera to accompany the filmstrip in the printing of the image frames, wherein said step of providing a reference word vocabulary further comprises the steps of:

providing a fixed vocabulary of words associated with data related to the photographic exposure of filmstrip image frames in a fixed vocabulary memory; and providing an adjustable vocabulary of words selected by the user in a adjustable vocabulary memory, wherein said step of providing an adjsutable vocabulary comprises:

providing a vocabulary source in the memory of a docking station for receiving the camera and making a connection with said camera adjustable vocabulary memory;

inserting the camera into the docking station to make the connection between the docking station memory and said camera adjustable vocabulary memory; and down loading the adjustable vocabulary from said docking station memory into said camera adjustable vocabulary memory.

19

20. The method of claim 19 wherein said step of providing a adjustable vocabulary comprises:

provinding sets of adjustable vocabulary sources in interchangeable memory cards;

selecting a memory card related to an event or attraction of photographic interest; and inserting the interchangeable memory card in a card receiving slot of said camera to thereby provide said camera adjustable vocabulary memory.

21. In a photographic camera including an optical lens, a photographic filmstrip transport mechanism for advancing the filmstrip in a path of travel to and through an image frame exposure gate with respect to said optical lens, and an exposure system for making an exposure of the filmstrip image frame in the exposure gate, a method of recording a voice message related to the exposure made for reproduction in conjunction with making prints from the photographic images captured in the image frames of the filmstrip, including the printing of the associated message, comprising the steps of:

processing spoken words of a common message to be stored with respect to the exposures of more than one image frame into a camera speech input means, at a time prior to making or in association with making at least one of the image frame exposures, as voice digital data;

providing reference voice digital data corresponding to a word vocabulary;

in a speech recognition operation, comparing the processed voice digital data to reference voice digital data

20 and recognizing processed voice digital data corresponding to the reference voice digital data while rejecting voice digital data not finding correspondence with the reference voice digital data;

at the time of exposure of image frames, selectively storing the recognized voice digital data corresponding to the common message into memory locations related to each image frame of the filmstrip in a memory means detachable from the camera to accompany the filmstrip in the printing of the image frames; and selecting the number of image frames that the common message is to be stored with at the time that the voiced words of the common message are processed.

22. The recording apparatus of claim 1 wherein:

said first vocabulary memory means comprises a read only memory in a detachable, interchangeable memory card stored with said fixed vocabulary with speaker independent training to be compared with a spoken word by said speech recognition means and a further read only memory stored with a further portion of said fixed vocabulary and a read and write memory for speaker dependent training of said further portion of said fixed vocabulary to be compared with a spoken word by said speech recognition means; and said apparatus further comprises:

card receiving means in said camera for receiving said read only memory card for making connection with said speech recognition means.

* * * * *